US006921108B2

(12) United States Patent
Kojima et al.

(10) Patent No.: US 6,921,108 B2
(45) Date of Patent: Jul. 26, 2005

(54) PROCESS FOR CONTROLLING DEPLOYMENT OF AIR BAG

(75) Inventors: Mikihito Kojima, Wako (JP); Toyohiko Shindo, Wako (JP); Makoto Nagai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/412,655

(22) Filed: Apr. 11, 2003

(65) Prior Publication Data

US 2004/0032118 A1 Feb. 19, 2004

(30) Foreign Application Priority Data

Apr. 18, 2002 (JP) ...................................... 2002-116709

(51) Int. Cl.⁷ ............................................. B60R 21/32
(52) U.S. Cl. ......................... 280/735; 180/273; 701/45
(58) Field of Search ............................... 180/273, 268; 307/10.1; 280/735; 701/45

(56) References Cited

U.S. PATENT DOCUMENTS

| | | | | |
|---|---|---|---|---|
| 6,282,473 B1 | * | 8/2001 | Steffens, Jr. ................. | 701/45 |
| 6,378,899 B1 | * | 4/2002 | Fujimoto ..................... | 280/735 |
| 6,487,483 B1 | * | 11/2002 | Gillis ........................... | 701/45 |
| 6,509,653 B2 | * | 1/2003 | Fujimoto et al. .......... | 307/10.1 |
| 6,578,870 B2 | * | 6/2003 | Winkler et al. ............. | 280/735 |
| 6,594,571 B2 | * | 7/2003 | Sakai et al. .................... | 701/45 |
| 6,609,054 B2 | * | 8/2003 | Wallace ....................... | 701/45 |
| 6,609,055 B2 | * | 8/2003 | Stanley ........................ | 701/45 |
| 6,678,600 B2 | * | 1/2004 | Basir et al. ................... | 701/45 |

* cited by examiner

Primary Examiner—Paul N. Dickson
Assistant Examiner—Toan C To
(74) Attorney, Agent, or Firm—Carrier, Blackman & Associates, P.C.; Joseph P. Carrier; William D. Blackman

(57) ABSTRACT

Four load sensors having an upper limit value in a detection range are mounted in a seat of a vehicle. The weight of an occupant sitting on the seat is detected as a total of outputs from the load sensors. When the detected weight of the occupant is equal or larger than a predetermined value, the deployment of the air bag is permitted, and when the detected weight of the occupant is smaller than the predetermined value, the deployment of the air bag is prohibited. When any one of the outputs from the plurality of load sensors is the upper limit value in the detection range, the deployment of the air bag is permitted irrespective of the detected weight of the occupant. Thus, even when the output from the load sensor has been modified to the upper limit value by a limiting process, so that the weight of the occupant is calculated as a value smaller than an actual weight to become smaller than the predetermined value, the air bag can be deployed reliably to restrain the occupant.

12 Claims, 6 Drawing Sheets

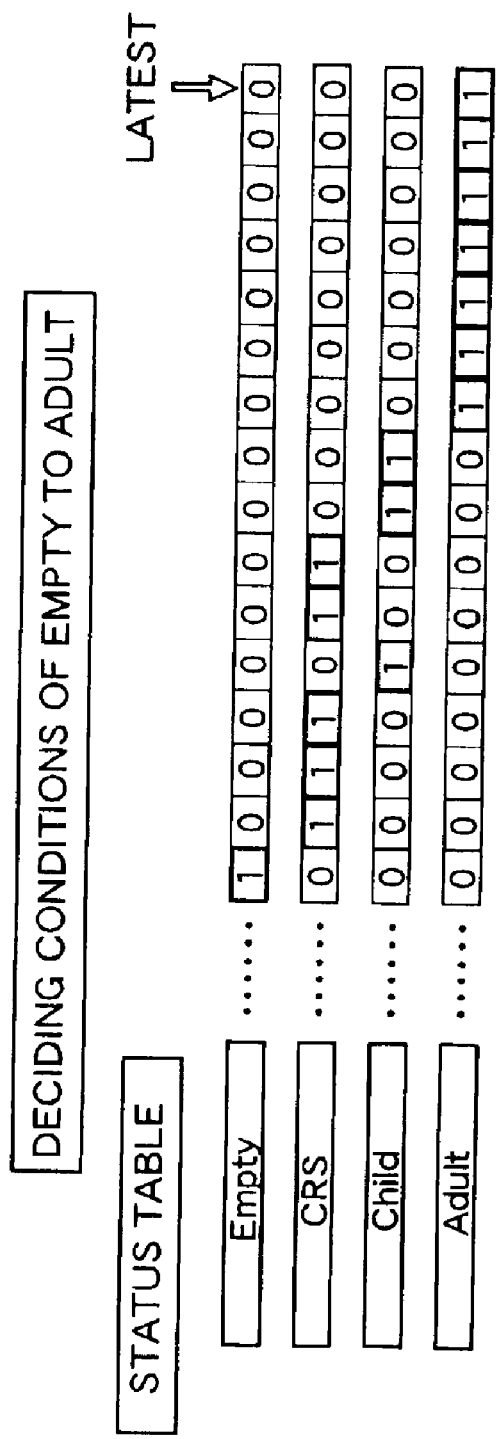

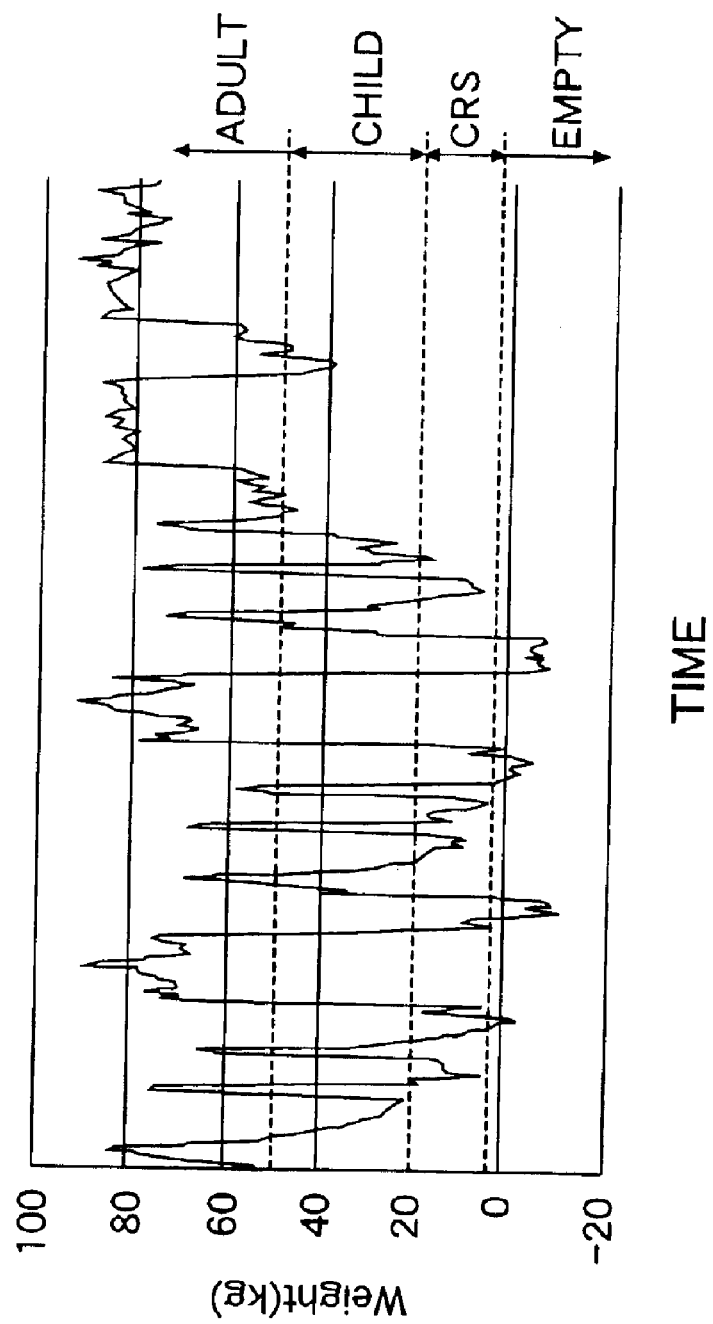

PROCESS FOR CONTROLLING DEPLOYMENT OF AIR BAG

BACKGROUND OF THE INVENTION

1. Field of the Invention

The present invention relates to a process for controlling deployment of an air bag, comprising the steps of preparing a plurality of load sensors mounted in a seat of a vehicle and having an upper limit value in a detection range, detecting the weight of an occupant sitting on the seat as a total of outputs from the sensors, permitting the deployment of the air bag when the detected weight of the occupant is equal or larger than a predetermined value, and prohibiting the deployment of the air bag when the detected weight of the occupant is smaller than the predetermined value.

2. Description of the Related Art

The operation or non-operation of an air bag device for an assistant driver's seat, the deployment speed of an air bag and the like are controlled depending on the physical constitution and the presence or absence, i.e., the status of an occupant sitting on the assistant driver's seat. For example, if the occupant is an adult or a child, the air bag device is operated. If the occupant is a baby or infant sitting in a child seat (CRS), or if there is no occupant sitting on the seat, the air bag device is not operated. Further, even when the air bag device is operated, control is carried out such that if the occupant is an adult, the air bag is deployed at a high speed, and if the occupant is a child, the air bag is deployed at a low speed. Thus, it is possible to exhibit an optimal restraining performance corresponding to the status of the occupant by the air bag device, and to avoid unnecessary deployment of the air bag. The judgment of the status has been conventionally carried out based on the weight of an occupant detected by a load sensor mounted in the seat.

When the status is judged based on the weight of an occupant detected by the load sensor, the following standard is provided for the judgment, as shown in FIG. 6: for example, when the weight is equal to or larger than 50 kg, the status is determined to be "adult"; when the weight is equal to or larger than 20 kg and smaller than 50 kg, the status is determined to be "child"; when the weight is equal to or larger than 2 kg and smaller than 20 kg, the status is determined to be "child seat" (namely, a baby or infant); and if the weight is smaller than 2 kg, the status is determined to be "empty". However, during traveling of a vehicle, not only a vertical acceleration due to the unevenness of a road surface is generated, but also a longitudinal acceleration due to an acceleration or deceleration and a lateral acceleration due to the turning of the vehicle are generated, so that the weight of the occupant detected by the load sensor mounted in the seat largely fluctuates, as shown in FIG. 6.

The output from the load sensor naturally changes depending on the vertical acceleration. The reason why the change in output from the load sensor depends on the longitudinal acceleration and the lateral acceleration is as follows: For example, when the vehicle is suddenly braked, an occupant sitting on the seat is thrown out forwards by an inertia, and hence a front portion of the seat is pushed against a floor, and a rear portion of the seat is lifted up from the floor. Therefore, when the load sensor is mounted at the front portion of the seat, a weight larger than an actual weight is detected; and when the load sensor is mounted at the rear portion of the seat, a weight smaller than the actual weight is detected. In the latter case, a negative weight may be detected.

To eliminate such disadvantages, it is conceived that a load sensor is mounted at each of four corners of the seat, and the status is judged from an average value or a total value of outputs from the four load sensors. However, such an output from each of the load sensors has an upper limit value and a lower limit value. The output over the upper limit value is modified to the upper limit value by a limiting process, and the output below the lower limit value is modified to the lower limit value by the limiting process. Therefore, when an adult or child is on the seat, there is a possibility that the air bag, which should be naturally deployed, is not deployed.

More specifically, when any one of the outputs from the four load sensors is modified to the upper limit value because it exceeds the upper limit value, an occupant's weight calculated from the average value or the total value of the outputs from the four load sensors is smaller than an actual weight. Therefore, there is a possibility that the status is erroneously judged as the child seat although the status is actually an adult or child, whereby the deployment of the air bag which should be naturally deployed is prohibited.

SUMMARY OF THE INVENTION

Accordingly, it is an object of the present invention to ensure that even when the output from the load sensor is modified to the upper limit value by the limiting process, the reliable deployment of the air bag can be achieved.

To achieve the above object, according to a first feature of the present invention, there is provided a process for controlling deployment of an air bag, comprising the steps of preparing a plurality of load sensors mounted 3 a seat of a vehicle and having an upper limit value in a detection range, detecting weight of an occupant sitting on the seat as a total of outputs from the sensors, permitting the deployment of the air bag when the detected weight of the occupant is equal to or larger than a predetermined value, and prohibiting the deployment of the air bag when the detected weight of the occupant is smaller than the predetermined value, wherein the deployment of the air bag is permitted irrespective of the detected weight of the occupant, when anyone of the outputs from the plurality of load sensors is the upper limit value in the detection range.

With the above arrangement, in the process comprising the steps of detecting the weight of the occupant as the total of the outputs from the plurality of load sensors mounted in the seat of the vehicle, permitting the deployment of the air bag when the detected weight of the occupant is equal to or larger than the predetermined value, and prohibiting the deployment of the air bag when the detected weight of the occupant is smaller than the predetermined value, the deployment of the air bag is permitted irrespective of the detected weight of the occupant, when any one of the outputs from the plurality of load sensors is the upper limit value in the detection range. Thus, even when the output from the load sensor has been modified to the upper limit value in the detection range by a limiting process, so that the weight of the occupant is calculated as a value smaller than an actual weight to become smaller than the predetermined value, the air bag can be deployed reliably to restrain the occupant.

The above and other objects, features and advantages of the invention will become apparent from the following description of the preferred embodiment taken in conjunction with the accompanying drawings.

BRIEF DESCRIPTION OF THE DRAWINGS

FIG. 5 is a diagram for explaining status tables and counters; and

FIG. 6 is a graph showing a fluctuation in an output from a load sensor.

DESCRIPTION OF THE PREFERRED EMBODIMENT

The present invention will now be described by way of a preferred embodiment with reference to the accompanying drawings.

Figure 1:
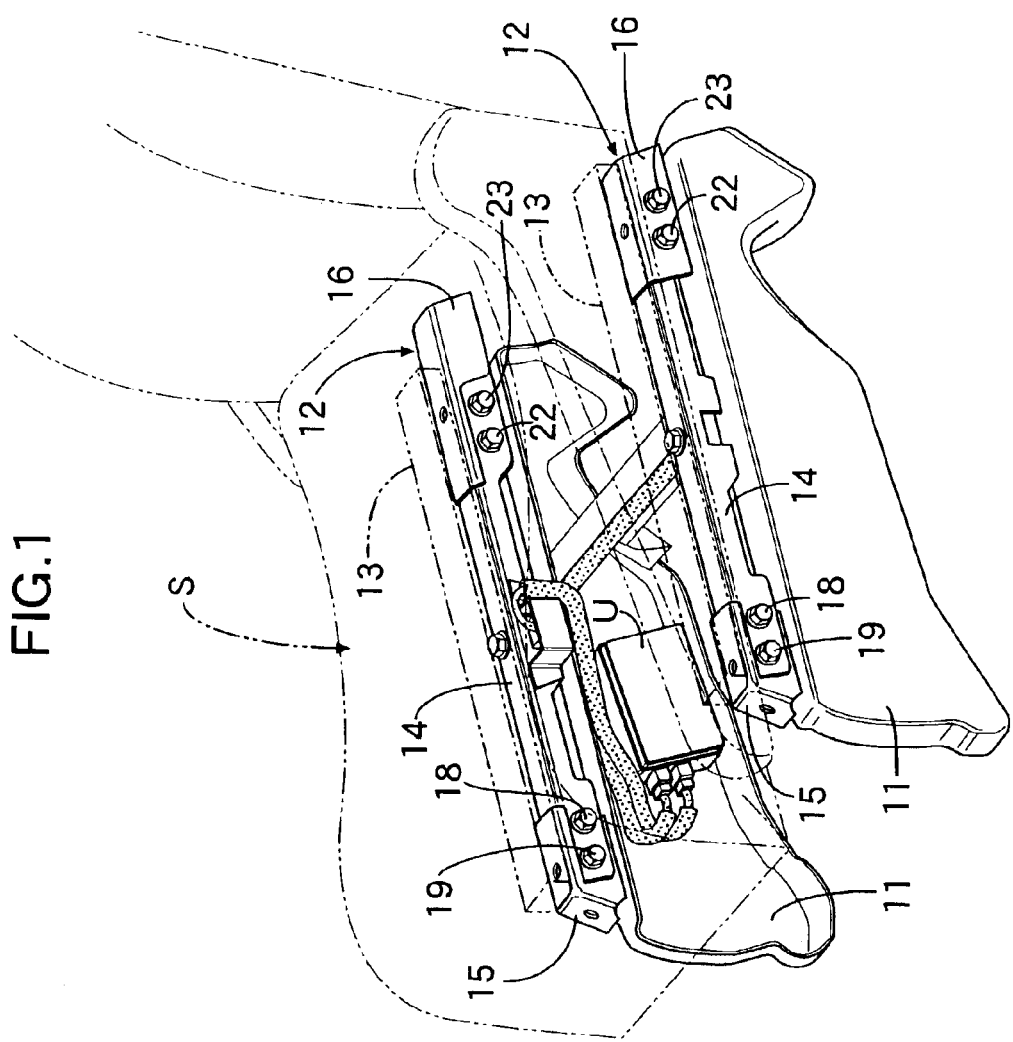
FIG. 1 is a perspective view of a physical constitution judging device mounted in a seat.

Referring first to FIG. 1, a pair of left and right base members 11, 11 are fixed to a floor of an automobile. A pair of left and right weight-detecting units 12, 12 are mounted along upper surfaces of the base members 11, 11, respectively. A seat S is longitudinally movably supported on a pair of left and right seat rails 13, 13 fixed to upper surfaces of the weight-detecting units 12, 12.

Figure 2:
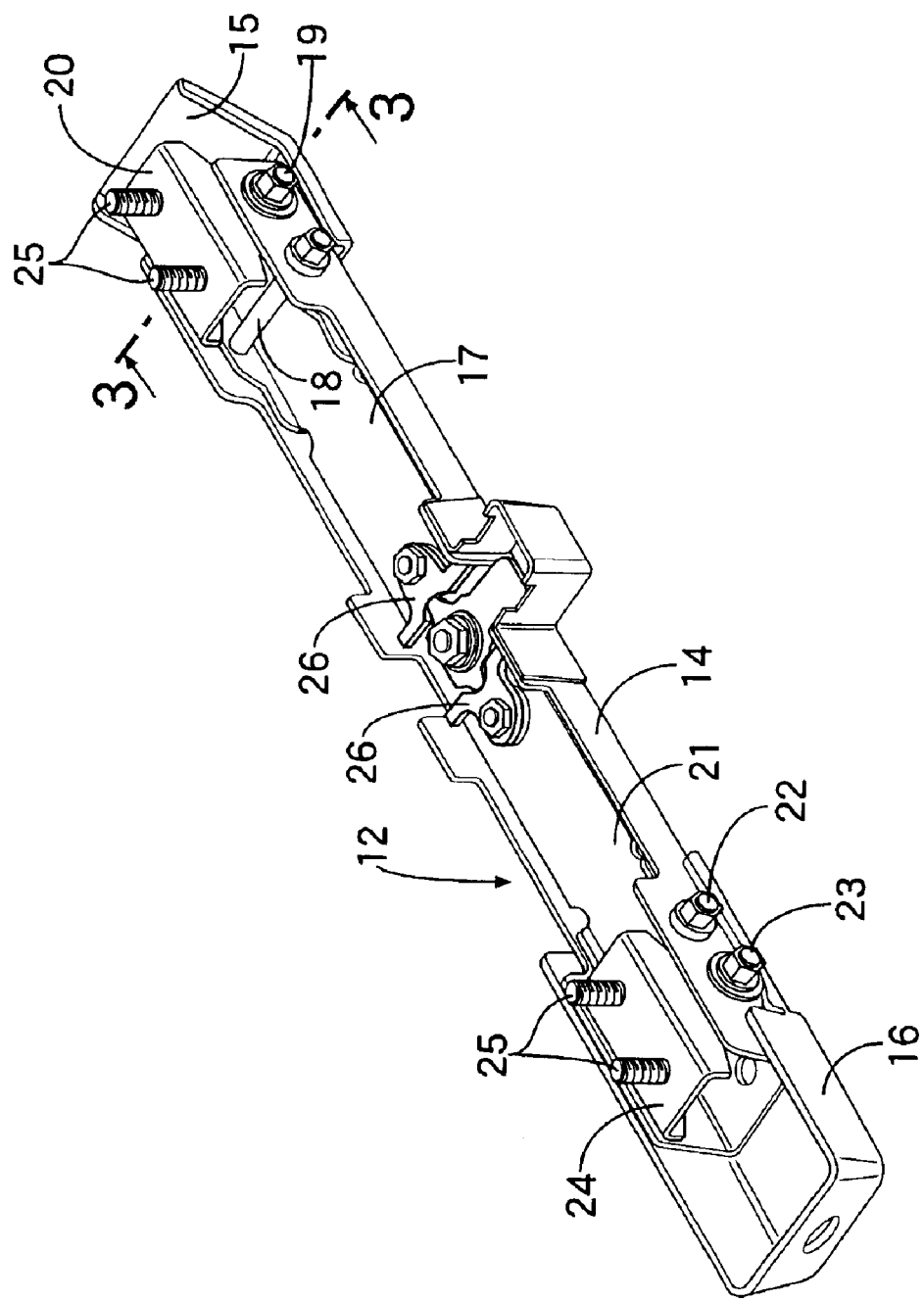
FIG. 2 is a view of a weight-detecting unit as viewed from the side of a lower surface.
Figure 3:
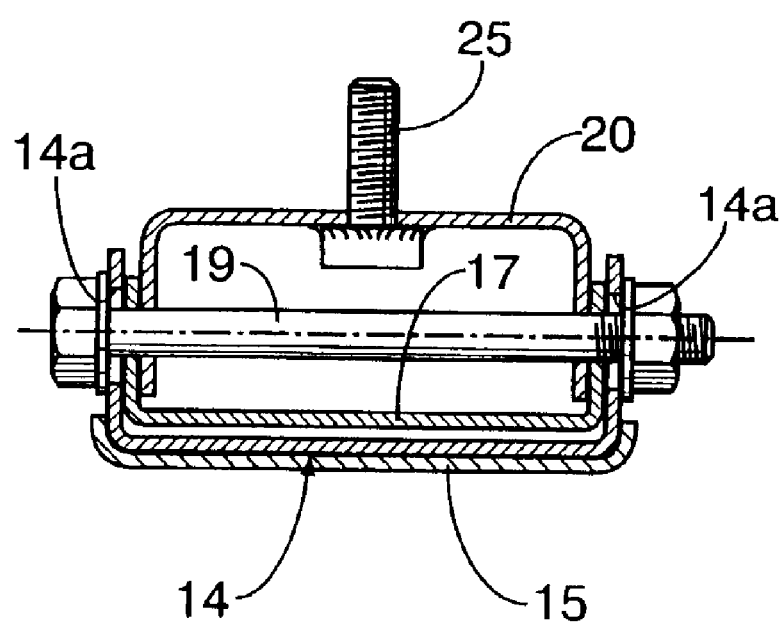
FIG. 3 is an enlarged sectional view taken along a line 3—3 in FIG. 2.

FIG. 2 shows the weight-detecting unit 12 in a state viewed from the side of its lower surface. The left and right weight-detecting units 12, 12 have substantially the same structure, and one of the weight-detecting units 12, 12 is shown in FIG. 2.

The weight-detecting unit 12 includes a sensor housing 14 having a groove-shaped section with its lower surface opened. Front and rear brackets 15 and 16 to which the seat rail 13 is coupled, are mounted at front and rear ends of the sensor housing 14. A front arm member 17 is accommodated in a front half of the sensor housing 14 and pivotally supported at its front portion on the sensor housing 14 by a support pin 18. A front load-receiving member 20 is supported at a front end of the front arm member 17 by a bolt 19. Likewise, a rear arm member 21 is accommodated in a rear half of the sensor housing 14 and pivotally supported at its rear portion on the sensor housing 14 by a support pin 22. A rear load-receiving member 24 is supported at a rear end of the front arm member 21 by a bolt 23. The bolts 19 and 23 I extend vertically movably through elongated bores 14a defined in the sensor housing 14.

Each of the front and rear mounting brackets 15 and 16 is fixed to the upper surface of the base member 11 by two bolts 25, 25. Two load sensors 26, 26 each comprising a load cell are mounted at a central portion of the sensor housing 14. A rear end of the front arm member 17 and a front end of the rear arm member 21 are connected to the load sensors 26, 26. An electronic control unit U is mounted on an inner surface of the right base member 11 and adapted to determine a physical constitution of an occupant sitting on the seat S or the presence or absence (status) of an occupant sitting on the seat S based on loads detected by the load sensors 26.

Figure 4:
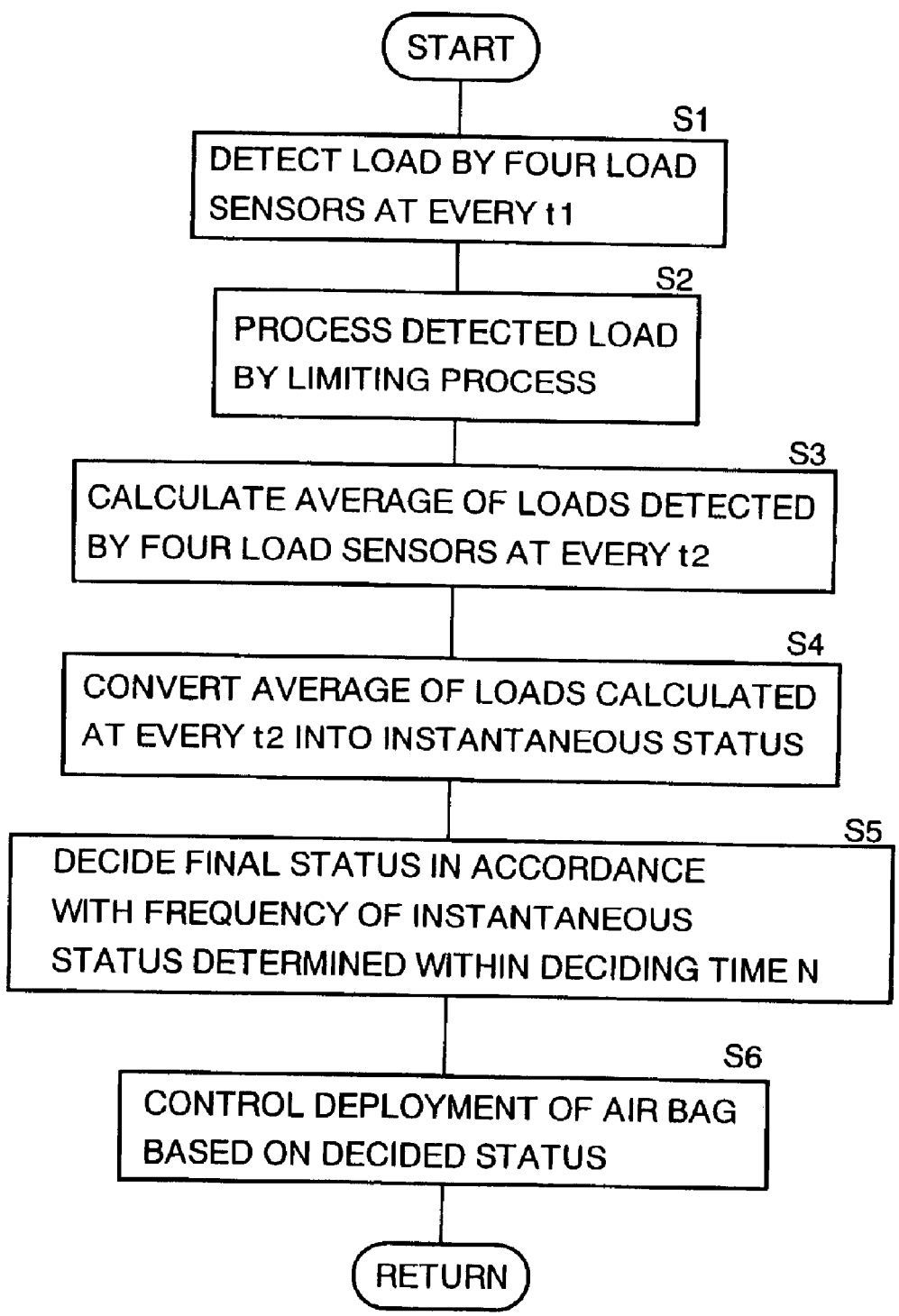
FIG. 4 is a flow chart for explaining a technique for judging a physical constitution.

A processing conducted in the electronic control unit U will be described with reference to a flow chart shown in FIG. 4.

First, at Step S1, loads applied in longitudinal and lateral directions to the seat 5 are detected by the four load sensors 26. More specifically, when the weight of the seat 5 itself and the weight of an occupant sitting on the seat S are applied to the four left and right load-receiving members 20, 20, 24,24, a moment about the support pin is applied to the four arm members 17, 17, 21, 21 which have received loads each input to one end thereof from the four load-receiving members 20,20,24,24, and loads are applied from the other ends of the four arm members 17, 17, 21,21 to the load sensors 26. Each of the load sensors 26 conducts the detection of the load at every first predetermined time period t1 (120 m sec. in the embodiment). Outputs from the four load sensors 26 are different from one another due to influences such as the attitude of an occupant sitting on the seat S, a longitudinal acceleration depending on an acceleration or a deceleration, a lateral acceleration depending on the turning and a vertical acceleration depending on an unevenness of a road surface.

At subsequent Step S2, if the load detected by each of the load sensors 26 exceeds an upper limit value or is below a lower limit value, a limiting process is carried out for limiting the output from the load sensor 26 to a load corresponding to the upper limit value or a load corresponding to the lower limit value.

At subsequent Step S3, an average value of the loads detected by the load sensors 26 is calculated at every second predetermined time period t2 (500 m sec. in the embodiment). The detection of the loads at the first predetermined time period t1 is carried out four or five times for each second predetermined time period t2, and hence, the average value of the loads is an average value resulting from the four or five calculations.

When the average value of the loads detected by the four load sensors 26 has been calculated for the second predetermined time period t2 in the above-described manner, the average value of the loads for the second predetermined time period t2 is converted to an instantaneous status at subsequent Step S4. If a child seat is mounted on the seat S, the detected load is a total of the weight of the child seat and the weight of a baby or infant sitting in the child seat. If there is no occupant sitting on the seat a, the detected load is a fluctuation component in weight of the seat S due to acceleration or a nose component. The weight of the occupant will be referred hereinafter to as one including these cases.

When the instantaneous status of the occupant is determined at every second predetermined time period t2 in the above-described manner, a final status is decided at Step S5, namely, it is decided whether the occupant is an adult or a child or a baby/infant sitting in the child seat, or the seat S is unoccupied or empty, based on the frequency of the instantaneous statuses determined within a deciding time longer than the second predetermined time period t2. At subsequent Step S6, the deployment of an air bag upon collision of a vehicle is controlled in accordance with the status. More specifically, if the occupant is an adult, the speed of deployment of the air bag is increased. If the occupant is a child, the speed of deployment of the air bag is decreased. In this manner, an optimal restraint performance depending on the status is achieved. If the occupant is a baby or infant sitting in the child seat, the deployment of the air bag for protecting the occupant is prohibited. If there is no occupant, the deployment of the air bag is prohibited in order to avoid unnecessary deployment.

A technique for judging a status will be described below with reference to FIG. 5.

The electronic control unit U is provided with four status tables corresponding to four statues "adult", "child", "child seat" and "empty seat", and "1" is set up in anyone of the four status tables, and "0" is set up in the other status tables, in accordance with the weight of an occupant calculated at every second predetermined time period t2. The status judged at the latest second predetermined time period t2 is an instantaneous status. One example of a standard for judging the instantaneous status is as described below. When the weight is equal to or larger than 50 kg, "adult"; when the weight is equal to or larger than 20 kg, "child"; when the weight is equal to or larger than 2 kg and smaller than 20 kg, "child seat" and when the weight is smaller than 2 kg, "empty" is determined to be the status.

A history of twenty four instantaneous statuses from a predetermined past time (e.g., 12 sec.) up to the present time is stored by shifting data of the status tables leftwards every time the second predetermined time period t2 is elapsed.

The electronic control unit U includes four counters corresponding to the four statuses "adult", "child", "child seat" and "empty". For example, if the status decided now is "empty", the counters corresponding to the remaining statuses "adult", "child" and "child seat" are operated. Every time the second predetermined time period t2 is elapsed, the data of the counters are shifted leftward, and in this case, "1" is added to the date of the counter corresponding to a region of the latest status table where the instantaneous status is "1".

A threshold value for judging each of the statuses is defined by exclusive time/deciding time =M/N. The exclusive time and the deciding time are measured using the second predetermined time period t2 as one unit. For example, in a threshold value for judging "empty" →"child seat", M=5 and N=10 (M/N=5/10), and in threshold values for judging "empty"→"child" and "empty"→"adult", M=7 and N=10 (M/N=7/10). Therefore, in an example shown in FIG. 5, if a latest counter value of "adult" becomes "7", the ratio of the exclusive time M=7 to the deciding time N=10 reaches the threshold, and it is judged that the status is shifted from "empty" to "adult".

When a new status is established in this manner, the status tables and the counters are reset.

As described above, the weight of the occupant detected by the load sensors 26 is allocated to a plurality of regions at every second predetermined time period t2, and the status is judged in accordance with the frequency of the instantaneous statuses allocated to each of the regions for the deciding time. Therefore, fluctuation in outputs from the load sensors 26 due to a temporary acceleration and noise can be eliminated to accurately judge the status.

TABLE 1

| | Adult | | | |
|---|---|---|---|---|
| | Case 1 | Case 2 | Case 3 | Case 4 |
| Metered weight is over upper limit value? | No | Yes | No | Yes |
| Metered weight is below lower limit value? | No | No | Yes | Yes |
| Total weight reliability | Normal | Below actual weight | Over actual weight | Unknown |
| A/B control | Deployed | There is a possibility of non-deployment | Deployed | Deployed or not deployed |
| Ideal A/B control | Deployed | Deployed | Deployed | Deployed |

When the limiting process is carried out as a result of that the load detected by any of the four load sensors 26 exceeds the upper limit or is below the lower limit value, the reliability of the weight of the occupant calculated based on the total of the outputs from the four load sensors 26 is an issue of consideration. When the occupant is "adult" or "child" and the air bag is required to be deployed upon collision of the vehicle, if neither the limiting process to the upper limit value nor the limiting process to the lower limit value has been carried out, as shown in the case 1 in Table 1, the reliability of the calculated weight of the occupant is normal, and the air bag is deployed by a usual control without hindrance. If the limiting process to the upper limit value has been carried out and the limiting process to the lower limit value has been not carried out, as in the case 2, the calculated weight of the occupant is smaller than the actual weight and thus, the status which is naturally "adult" or "child" is judged erroneously as being "child seat" or "empty", and there is a possibility that the air bag which should be deployed is not deployed. Therefore, if the limiting process to the upper limit value has been carried out and the limiting process to the lower limit value has been not carried out, the air bag is forcibly deployed irrespective of the type of the status.

If the limiting process to the lower limit value has been carried out and the limiting process to the upper limit value has been not carried out, as in the case 3, the calculated weight of the occupant must be larger than the actual weight, and there is not a possibility that the air bag which should be naturally deployed is not deployed. Therefore, the air bag is deployed by the usual control without hindrance. If both the limiting process to the upper limit value and the limiting process to the lower limit value have been carried out, as in the case 4, the relationship between magnitudes of the calculated weight and the actual weight of the occupant is unknown, and the status which is naturally "adult" or "child" is judged erroneously as "child seat" or "empty", and there is a possibility that the air bag which should be naturally deployed is not deployed. Therefore, when both the limiting process to the upper limit value and the limiting process to the lower limit value have been carried out, the air bag is forcibly deployed irrespective of the type of the status.

From the forgoing, by forcibly deploying the air bag irrespective of the type of the status when the limiting process to the upper limit value has been carried out, it is possible to reliably prevent the air bag which should be naturally deployed from being not deployed.

When the status is "child seat", the air bag is not required to be deployed, but when the control shown in Table 1 is introduced, there is a possibility that the air bag is deployed when the child seat is mounted.

TABLE 2

| | CRS | | | |
|---|---|---|---|---|
| | Case 1 | Case 2 | Case 3 | Case 4 |
| Metered weight is over upper limit value? | No | Yes | No | Yes |
| Metered weight is below lower limit value? | No | No | Yes | Yes |
| Total weight reliability | Normal | Below actual weight | Over actual weight | Unknown |
| A/B control (over upper limit/out of range → unidentified weight) | Not Deployed | Deployed | There is a possibility of deployment | Deployed |
| Ideal A/B control | Not Deployed | Not Deployed | Not Deployed | Not Deployed |

If neither the limiting process to the upper limit value nor the limiting process to the lower limit value has been carried out, as shown in the case 1 in Table 2, the reliability of the calculated weight of the occupant is normal and there is not a possibility that the air bag is deployed. If the limiting process to the upper limit value has been carried out as in the case 2 and the case 4, the control shown in Table 1 is carried out, whereby the air bag is forcibly deployed. If the limiting process to the lower limit value has been carried out as in the case 3, the calculated weight of the occupant (the weight of the child seat) is larger than the actual weight and hence, there is likewise a possibility that the air bag is deployed.

As described above, if the control shown in Table 1 is employed, there is a possibility that the situations in the cases 2 to 4 in Table 2 occur to deploy the air bag, when the child seat is mounted, ie., in this case where the air bag should not be deployed. To avoid this, it is required that the situations in the cases 2 to 4 in Table 2 do not occur. For this purpose, it, is required that the upper and lower limit values are set with a margin so that the outputs from the load sensors 26 do not exceed the upper limit value or are not below the lower limit value when the child seat has been mounted, namely, so that the control shown in Table 1 is not carried out.

Although the embodiments of the present invention have been described in detail, it will be understood that various modifications in design may be made without departing from the spirit and scope of the invention defined in the claims.

For example, the four load sensors 26 have been mounted in the embodiment, but the number of the load sensors 26 is not limited to four, and may be two, three or five or more.

What is claimed is:

1. A process for controlling deployment of an air bag, comprising the steps of preparing a plurality of load sensors mounted in a seat of a vehicle and having an upper limit value in a detection range, detecting weight of an occupant sitting on the seat as a total of outputs from said sensors, permitting the deployment of the air bag when the detected weight of the occupant is equal to or larger than a predetermined value, and prohibiting the deployment of the airbag when the detected weight of the occupant is smaller than the predetermined value, wherein the deployment of the air bag is permitted irrespective of the detected weight of the occupant, when any one of the outputs from said plurality of load sensors is the upper limit value in the detection range.

2. The process according to claim 1, further comprising the steps of:

detecting loads by the load sensors at every first predetermined time period;

calculating an average value of the loads detected by the load sensors at every second predetermined time period longer than the first predetermined time period;

allocating the average value as an instantaneous status to one of a plurality of different weight-associated regions; and judging a status of the occupant in accordance with a frequency of instantaneous statuses allocated to each of the regions during a deciding time period.

3. The process according to claim 2, comprising the further step of controlling deployment of the air bag based on said judged status of the occupant.

4. The process according to claim 2, wherein said weight-associated regions include regions corresponding to the presence of an adult, a child, or a child seat and a region corresponding to an empty seal.

5. The process according to claim 2, wherein said deciding time period comprises a predetermined past time period up to the present time, and includes a plurality of said instantaneous statuses occurring therein.

6. The process according to claim 5, wherein the status of the occupant is judged based on a history of said instantaneous statuses occurring during said deciding time period.

7. The process according to claim 5, wherein the status of the occupant is judged to correspond to one of said weight-associated regions whenever at least a predetermined percentage of said instantaneous statuses in said deciding time period is allocated to said one weight-associated region.

8. The process according to claim 1, wherein said sensors detect the weight of an occupant sitting on the seat based on loads applied in longitudinal and lateral directions to the seat.

9. The process according to claim 1, wherein said upper limit value in the detection range is set with a margin.

10. The process according to claim 1, wherein each of said sensors is associated with a load-receiving member and an arm member, the weight of an occupant sitting on the seat is applied to the load-receiving members, a moment is applied to first ends of each of the arm members from corresponding ones of the load-receiving members, and opposite ends of said arm members apply loads to corresponding ones of said sensors which are sensed at the weight of the occupant.

11. The process according to claim 1, further comprising the step of limiting any load detected by the load sensors 26 to a load corresponding to said upper limit value when the detected load exceeds the upper limit value, and wherein said upper limit value is set with a margin.

12. The process according to claim 2, wherein said deciding time period is longer than the second predetermined time period.

* * * * *

UNITED STATES PATENT AND TRADEMARK OFFICE
CERTIFICATE OF CORRECTION

PATENT NO.    : 6,921,108 B2
DATED         : July 26, 2005
INVENTOR(S)   : Mikihito Kojima, Toyohiko Shindo and Makoto Nagai It is certified that error appears in the above-identified patent and that said Letters Patent is hereby corrected as shown below:

Column 3,
Line 61, change "directions to the seat 5" to -- directions to the seat S --.
Line 62, change "when the weight of the seat 5 itself" to -- when the weight of the seat S itself --.

Column 4,
Line 34, change "sitting on the seat a" to -- sitting on the seat S --.

Signed and Sealed this

Fourteenth Day of February, 2006

JON W. DUDAS
*Director of the United States Patent and Trademark Office*